Patented Apr. 23, 1946

2,399,134

UNITED STATES PATENT OFFICE 2,399,134

METHOD OF REMOVING OXIDE COATING FROM ALUMINUM SURFACES

Mike A. Miller, New Kensington, and Wayne E. White, Plum Township, Allegheny County, Pa., assignors to Aluminum Company of America, Pittsburgh, Pa., a corporation of Pennsylvania No Drawing. Application February 24, 1943, Serial No. 476,918

4 Claims. (Cl. 252—143)

This invention relates to a method of treating aluminum surfaces, and more particularly to the provision of materials which will remove aluminum oxide from said surfaces. The term "aluminum" as here employed is intended to include both aluminum and aluminum base alloys.

Aluminum surfaces are usually covered with a coating, generally referred to as an "oxide coating," which consists substantially of aluminum oxide, though other substances may also be present. A thin film of this substance always forms on aluminum surfaces when they are exposed to the atmosphere, while a much heavier coating of oxide may be produced by well-known artificial means either with or without the application of electric current.

It frequently becomes desirable to remove the oxide coating from aluminum surfaces. While a variety of materials have been proposed for this purpose, many of them have the disadvantage of attacking the underlying aluminum surface at the same time the oxide coating is being removed. Others, while free of attack upon the aluminum surface, remove the oxide at a very slow rate unless employed at relatively high temperatures.

It is accordingly an object of this invention to provide a method of removing the oxide coating from aluminum surfaces. A more particular object is to effect this removal in a rapid manner and at room temperatures, yet without any appreciable attack on the underlying aluminum surface.

It is our discovery that the oxide coating may be completely removed through the application to the aluminum surface of a solution containing hydrogen fluoride and water, the balance of the solution being substantially a suitable alcohol or alcohol derivative compound. The alcohol or alcohol derivative compounds which are effective for this purpose are those of proper melting point which are selected from the group comprising monohydric alcohols, polyhydric alcohols, those hydroxy ethers derived from the polyhydric alcohols which retain at least one hydroxyl group, and the alcohol derivative compound dioxan (diethylene oxide). These alcohols and alcohol derivative compounds are grouped together for the purpose of this invention and are referred to herein as "alcoholic compounds."

The alcoholic compounds which have been found to be satisfactory are those which have a melting point below about 40° C. Compounds coming within this class are usually liquid at room temperatures, and this is convenient since the process described herein can readily be carried on at such temperatures.

Examples of suitable monohydric alcohols are methyl, ethyl, isopropyl, and butyl alcohols, while illustrative polyhydric alcohols are glycol and glycerol. A suitable ether compound, for example, is monoethyl ether of diethylene glycol. Of the various alcoholic compounds which may be successfully employed, however, we prefer to use methyl alcohol, glycol, glycerol, or mixtures of these substances.

The solution is customarily prepared by passing anhydrous hydrogen fluoride gas into the liquid alcoholic compound. This results in the absorption of the hydrogen fluoride. The amount of hydrogen fluoride absorbed in the alcoholic compound is not critical, but solutions containing from 5 to 40 per cent by weight of hydrogen fluoride are preferred. Solutions containing less than 5 per cent of hydrogen fluoride act so slowly that they are not attractive for commercial operation, whereas once the limit of about 40 per cent by weight of hydrogen fluoride is reached, further additions do not materially improve the effectiveness of the solution. In general, the stronger the solution up to about 40 per cent by weight of hydrogen fluoride, the faster the solution will remove the oxide coating at any given temperature.

If desired, a satisfactory solution may be prepared by mixing a strong aqueous solution of hydrogen fluoride with the alcoholic compound. However, inasmuch as even the strongest hydrogen fluoride solutions which are commercially available contain relatively large amounts of water, the amount of hydrogen fluoride which may be introduced into the alcoholic compound in this fashion is small due to the fact that the water content of the solution must be kept low.

The water content of the solution must be closely controlled. This component should comprise at least about 1 per cent, though not more than about 5 per cent, by weight of the solution. If the amount of water is less than 1 per cent, the solution has little activity and will remove the oxide coating but slowly, whereas those solutions containing more than 5 per cent water have a tendency to attack the aluminum surface.

Accordingly, it will be seen that the solutions which are useful for the purposes of this invention are those containing between 1 and 5 per cent by weight water and at least 5 per cent by weight hydrogen fluoride, the balance of the solution being substantially made up of one or more suitable alcoholic compounds having a melting point below about 40° C.

The article from which the oxide coating is to be removed may simply be immersed in the solution for a suitable period of time, or the solution may be applied to a given area of the article. The cleaned surfaces are then washed with water, or first wiped and then washed with water. The time necessary to leave the article in contact with the alcoholic solution in order to effect complete removal of the oxide coating will vary depending on the type of coating, on the hydrogen fluoride content and on the temperature. At 4° C., for example, 75 minutes were required to clean a specimen which was cleaned to a corresponding extent in the same solution in 10 minutes at 25° C. It has been our experience that at room temperature a period of 10 minutes will suffice to remove even the heaviest oxide coatings when solutions containing but about 5 per cent hydrogen fluoride are employed. This time may be materially shortened as the hydrogen fluoride concentration is increased.

This invention finds application in many ways. The solutions have proved particularly convenient, for example, in removing oxide coatings from laboratory specimens which are to be subjected to metallographic examination for the purpose of determining metal structure. For such use, it is desirable to remove the oxide coating without attacking the underlying metal surface. Again, the solutions disclosed herein may be used for removing the soft, smudge-like film of aluminum oxide which forms on aluminum surfaces during an electrolytic brightening treatment. Another application involves the cleaning of aluminum objects prior to a joining operation. Many aluminum articles are given a particular decorative finish and thereafter are provided with a heavy oxide coating to protect the finish. In some instances it becomes necessary to remove this oxide coating prior to a subsequent coating step; for this purpose it is obviously desirable to employ a medium such as that here disclosed which will remove the oxide coating yet which will in no way modify the appearance of the underlying metal.

We claim:

1. A method for removing the oxide coating from aluminum surfaces, comprising subjecting said surfaces to the action of a solution containing about 1 to 5 per cent by weight water and from about 5 per cent to about 40 per cent by weight hydrogen fluoride, the balance of the solution being substantially made up of at least one compound selected from the group consisting of dioxan and those monohydric alcohols, polyhydric alcohols, and ethers containing at least one hydroxyl group derived from polyhydric alcohols, which have a melting point below about 40° C.

2. A method for removing the oxide coating from aluminum surfaces, comprising subjecting said surfaces to the action of a solution containing about 1 to 5 per cent by weight water and from about 5 per cent to about 40 per cent by weight hydrogen fluoride, the balance of the solution being substantially methyl alcohol.

3. A method for removing the oxide coating from aluminum surfaces, comprising subjecting said surfaces to the action of a solution containing about 1 to 5 per cent by weight water and from about 5 per cent to about 40 per cent by weight hydrogen fluoride, the balance of the solution being substantially glycol.

4. A method for removing the oxide coating from aluminum surfaces, comprising subjecting said surfaces to the action of a solution containing about 1 to 5 per cent by weight water and from about 5 per cent to about 40 per cent by weight hydrogen fluoride, the balance of the solution being substantially glycerol.

MIKE A. MILLER.
WAYNE E. WHITE.